J. E. STRUER.
SLIP JOINT COUPLING FOR STEAM PIPES.
APPLICATION FILED JUNE 30, 1908.
915,502.
Patented Mar. 16, 1909.
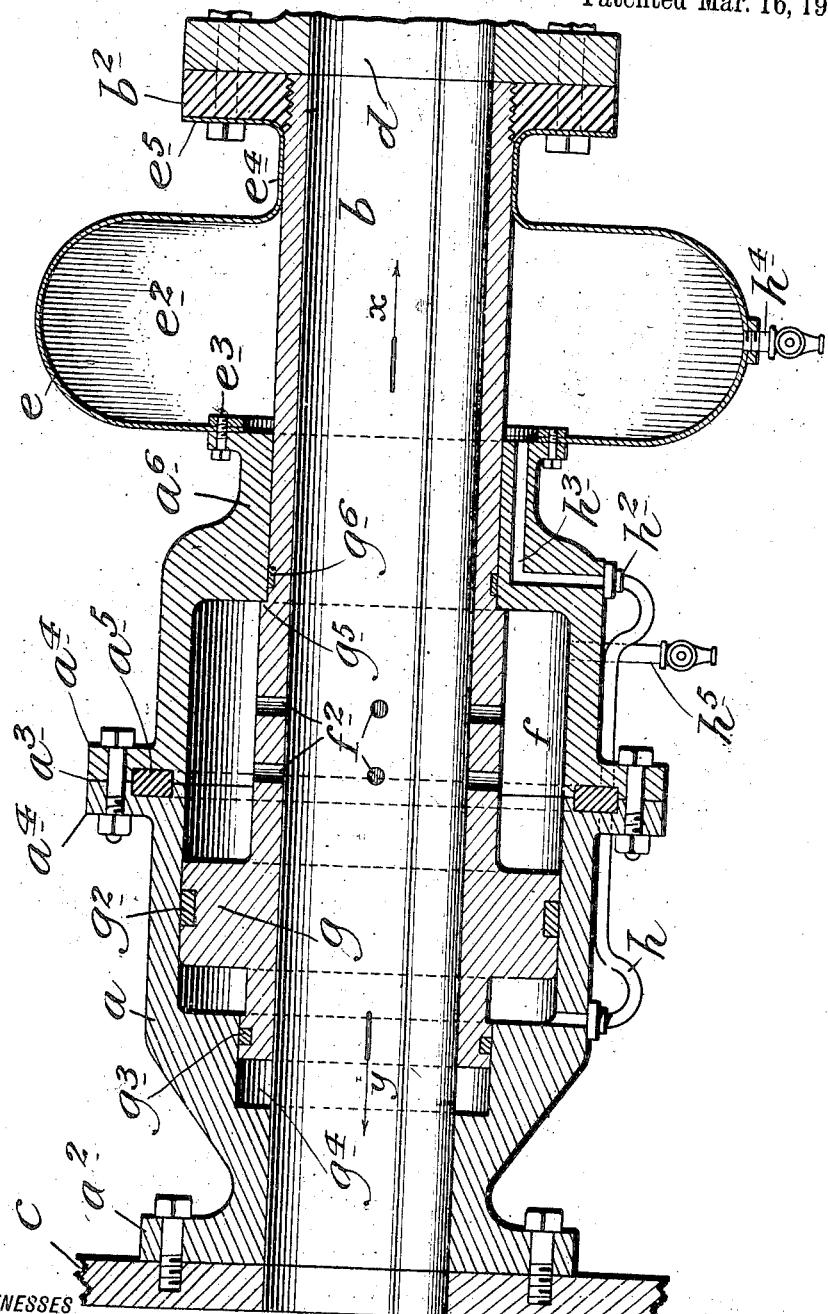

UNITED STATES PATENT OFFICE.

JULIUS E. STRUER, OF BROOKLYN, NEW YORK.

SLIP-JOINT COUPLING FOR STEAM-PIPES.

No. 915,502.

Specification of Letters Patent.

Patented March 16, 1909.

Application filed June 30, 1908. Serial No. 441,190.

*To all whom it may concern:*

Be it known that I, JULIUS E. STRUER, a citizen of the United States, and residing at Brooklyn, in the county of Kings and State of New York, have invented certain new and useful Improvements in Slip-Joint Couplings for Steam-Pipes, of which the following is a specification, such as will enable those skilled in the art to which it appertains to make and use the same.

This invention relates to slip joints for steam pipe couplings, and the object thereof is to provide an improved device of this class particularly designed to be connected with a high pressure steam boiler, and in which the longitudinal movement of the longitudinally movable member of the joint or coupling is controlled or regulated by steam pressure in said joint or coupling operating in the direction of the boiler and to move said longitudinal member of the joint or coupling in the direction of the boiler and to prevent too great and sudden movement of said part in the opposite direction, and thus avoid the structural shocks or jars in the steam pipe connected with said joint or coupling and in the various joints or connections of said steam pipe and in the joints or connections of the coupling; and with these and other objects in view the invention consists in a slip joint or coupling for steam pipes connected as hereinafter described and claimed.

The invention is fully disclosed in the following specification, of which the accompanying drawing forms a part, in which the separate parts of my improvement are designated by suitable reference characters, said drawing being a longitudinal sectional view of my improved slip joint coupling.

My invention comprises a main outer casing $a$ and a pipe $b$, one end of which passes into one end of the casing $a$, and the opposite end of the casing $a$ is provided with a flange $a^2$ by which it may be secured to the casing $c$ of a boiler or to a pipe which is in turn connected with a boiler, and the outer end of the pipe $b$ is provided with a flange $b^2$ which is secured thereto and by means of which it may be connected with a steam pipe $d$ by which steam is conveyed to an engine or power device.

The casing $a$ is divided at $a^3$ into two parts, having flanges $a^4$ by which they are bolted together and between which is placed a packing ring $a^5$, and the end of the casing $a$ opposite the boiler end thereof is provided with a neck $a^6$, and mounted on the pipe $b$, between the neck $a^6$ of the casing $a$ and the flange $b^2$ of the pipe $b$, is an annular casing $e$ of copper forming an annular chamber $e^2$ around the pipe $b$, and the inner side of the casing $e$ is secured to the neck $a^6$ of the main outer casing $a$ of the slip joint as shown at $e^3$, while the outer wall of the casing $e$ is provided with a neck $e^4$ having a flange $e^5$ which is secured to the flange $b^2$ of the pipe $b$ of the slip joint or coupling.

The main outer casing $a$ of the slip joint or coupling is enlarged to form an annular chamber $f$ which is placed in communication with the pipe $b$ by radial ports or passages $f^2$, and the pipe $b$ where it passes through the main outer casing $a$, or through the chamber $f$ is provided with an annular collar $g$ which forms a piston which closely fits the outer wall of the chamber $f$ and is provided with a packing $g^2$, and the inner end of the pipe $b$ is also provided with a packing $g^3$ and is movable in an annular chamber $g^4$ formed in the main outer casing $a$ of the slip joint or coupling. The pipe $b$ is also provided with an annular shoulder $g^5$ which limits the outward movement thereof, and with a packing ring $g^6$. I also connect with the inner end portion $f^3$ of the chamber $f$ a drain pipe $h$ which ranges longitudinally of the main outer casing $f$ and connects at $h^2$ with an angular passage $h^3$ in the end portion of the casing $a$ adjacent to the annular casing $e$ and which communicates with the annular chamber $e^2$ formed by the casing $e$, and said chamber is provided with a drain pipe $h^4$, and the outer or main part of the chamber is also provided with a drain pipe $h^5$.

The parts of my improved coupling are assembled by first inserting the pipe $b$ into the left end portion of the main outer casing $a$, then passing the right end portion of said main outer casing into position over said pipe, then placing the casing $e$ in position on the pipe $b$, and then screwing the flange $b^2$ onto the end of said pipe.

The operation will be readily understood from the foregoing description, when taken in connection with the accompanying drawing and the following statement thereof. If high pressure steam be passing through the coupling from the boiler or in the direction of the arrow $x$, the steam will also pass through the ports or passages $f^2$ into the annular chamber $f$, and will operate on the piston $g$ to hold the pipe $b$ in its normal position, or prevent its outward movement. When high pressure steam is passing through a coupling of this class under ordinary conditions there is frequently a great strain occasioned on the steam pipe $d$ and its connections, especially if said connections contain or involve elbow or other angular joints, the quick movement of the pipe $b$ serving to disturb or break such joints and also to injure the parts of the coupling or the connections thereof. With my improvement however, the steam in the chamber $f$ operates to force the pipe $b$ toward the boiler or in the direction of the arrow $y$ and to prevent said pipe from too great movement in the direction of the arrow $x$, but the construction and arrangement of my improved coupling are such as to permit of the usual or necessary expansion and contraction of the parts thereof.

The transverse dimensions of the annular chamber $f$ are preferably, in practice, about equal to the transverse inner dimensions of the pipe $b$ and this, as will be understood, operates to equalize the pressure in said pipe, and said chamber and the pipe $b$ is as apt to move in the opposite direction as it is in the direction of the arrow $x$. It will be understood, however, that the pressure operating to hold the pipe $b$ or to force it in the direction of the arrow $y$ will depend upon the dimensions of the chamber $f$, and these dimensions may be regulated as desired.

Any water of condensation that may collect in the end portion $f^3$ of the chamber $f$ will pass through the pipe $h$ and into the annular chamber $e^2$ in the casing $e$, and may be drawn off as will be readily understood, and any water of condensation in the end portion $f^4$ of the chamber $f$ may be drawn off through the pipe $h^5$. The annular casing $e$ being made of thin copper will yield so as to accommodate itself to any movement of the pipe $b$ within the main outer casing $a$ of the slip joint or coupling, and it will be understood that there is never any material pressure in the annular chamber $e^2$. The casing $e$ being made of copper also aids in controlling the movement of the pipe $b$, the elastic qualities thereof operating to some extent in the same manner as the steam in the chamber $f$.

Having fully described my invention, what I claim as new and desire to secure by Letters Patent, is:—

1. In a slip joint or coupling for steam pipes, a main outer casing, a pipe passing into one end thereof and movable longitudinally therein, said main outer casing being provided with an annular chamber through which said pipe passes, and said pipe being provided with an annular collar forming a piston movable in said chamber, steam ports forming a communication between said chamber and said pipe, and a flexible annular casing mounted on the outer end portion of said pipe and connected with the adjacent end portion of the main outer casing and forming an annular chamber which is in communication with the annular chamber in the main outer casing.

2. In a slip joint for fluid pressure pipes, a main outer casing, a pipe passing into one end thereof and movable longitudinally therein, said main outer casing being provided with an annular chamber through which said pipe passes, and said pipe being provided with an annular collar movable in said chamber, an annular flexible casing mounted on the outer end portion of said pipe and connected with the adjacent end portion of the main outer casing and with the outer end portion of said pipe and forming an annular chamber which is in communication with the farther end portion of the chamber in the main outer casing, the adjacent end portion of the chamber in the main outer casing being in communication with the interior of said pipe.

In testimony that I claim the foregoing as my invention I have signed my name in presence of the subscribing witnesses this 29th day of June 1908.

JULIUS E. STRUER.

Witnesses:
 A. R. APPLEMAN,
 C. E. MULREANY.